US006990607B2

(12) United States Patent
Sim et al.

(10) Patent No.: US 6,990,607 B2
(45) Date of Patent: Jan. 24, 2006

(54) SYSTEM AND METHOD FOR ADAPTIVE STORAGE AND CACHING OF A DEFECT TABLE

(75) Inventors: Jeffrey Soon Beng Sim, Singapore (SG); WeiLoon Ng, Singapore (SG); Aik Chuan Lim, Singapore (SG); YongPeng Chng, Singapore (SG); Kay Hee Tang, Singapore (SG); Steven TianChye Cheok, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 545 days.

(21) Appl. No.: 09/965,669

(22) Filed: Sep. 27, 2001

(65) Prior Publication Data

US 2002/0108072 A1    Aug. 8, 2002

Related U.S. Application Data

(60) Provisional application No. 60/235,608, filed on Sep. 27, 2000.

(51) Int. Cl.
  *G06F 11/00* (2006.01)
(52) U.S. Cl. .................................. 714/8; 369/53.15
(58) Field of Classification Search .................... 714/6, 714/8, 7, 5; 369/53.15, 53.17; 711/113
  See application file for complete search history.

(56) References Cited

U.S. PATENT DOCUMENTS

| | | | |
|---|---|---|---|
| 4,498,146 A | 2/1985 | Martinez | 364/900 |
| 5,740,358 A | 4/1998 | Geldman et al. | 395/184.01 |
| 6,092,195 A * | 7/2000 | Nguyen | 713/200 |
| 6,151,660 A | 11/2000 | Aoki | 711/129 |
| 6,212,647 B1 | 4/2001 | Sims, III et al. | 714/8 |
| 6,223,303 B1 | 4/2001 | Billings et al. | 714/8 |
| 6,246,537 B1 * | 6/2001 | Shirane | 360/78.08 |
| 6,272,571 B1 | 8/2001 | Bachmat | 710/74 |
| 6,421,747 B1 * | 7/2002 | Wilson | 710/56 |
| 6,549,499 B2 * | 4/2003 | Takagi et al. | 369/53.16 |
| 6,778,480 B2 * | 8/2004 | Nadershashi et al. | 369/53.15 |
| 2002/0056054 A1 * | 5/2002 | Yamamoto et al. | 714/8 |
| 2003/0126528 A1 * | 7/2003 | Kim et al. | 714/719 |

* cited by examiner

*Primary Examiner*—Robert Beausoliel
*Assistant Examiner*—Marc Duncan
(74) *Attorney, Agent, or Firm*—Kirk A. Cesari

(57) ABSTRACT

In one embodiment of the present invention, systems and methods are provided through which the capacity of a defect buffer in a microcontroller of a mass storage device is determined without regard for the quantity of defects on a recording medium. The capacity of the defect buffer is determined in varying examples, based on the amount of available buffer space and/or the application of the storage device. In one embodiment, the capacity of the defect buffer is less than the quantity of defects on the recording medium, wherein entries in a defect table on the recording medium are swapped in and out of the defect buffer as needed, such as using a most-recently-used scheme. In another embodiment of the present invention, systems and methods are provided through which the defect table is partitioned into a plurality of segments that are physically distributed throughout the recording medium.

18 Claims, 15 Drawing Sheets

| PHYSICAL ZONE | START CYLINDER | HEAD 0 SECS/TRK | HEAD 1 SECS/TRK |
|---|---|---|---|
| 0 | 0 | 12 | 12 |
| 1 | 4 | 10 | 10 |

Fig.1 (Prior Art)

| LOGICAL ZONE | START LBA | START CYLINDER | HEAD 0 SECS/TRK | HEAD 1 SECS/TRK |
|---|---|---|---|---|
| 0 | 0 | 0 | 11 | 11 |
| 1 | 88 | 4 | 9 | 9 |

Fig.2 (Prior Art)

| INDEX | DEFECT | | | SPAN | REASSIGNED TO CYL/HEAD/SECT |
|---|---|---|---|---|---|
| | HEAD | CYL | SECT | | |
| 0 | 0 | 3 | 2 | 1 | |
| 1 | 0 | 3 | 9 | 1 | 3/1/11 |
| 2 | 0 | 4 | 5 | 1 | |
| 3 | 0 | 5 | 1 | 1 | |
| 4 | 0 | 5 | 3 | 1 | 5/1/9 |
| 5 | 0 | 5 | 5 | 1 | 6/0/9 |
| 6 | 1 | 0 | 8 | 1 | |
| 7 | 1 | 1 | 6 | 1 | |
| 8 | 1 | 2 | 8 | 1 | |
| 9 | 1 | 6 | 6 | 1 | |

Fig.3 (Prior Art)

SYSTEM AND METHOD FOR ADAPTIVE STORAGE AND CACHING OF A DEFECT TABLE

RELATED APPLICATION

This application claims the benefit of U.S. Provisional Application Ser. No. 60/235,608 filed Sep. 27, 2000 under 35 U.S.C. 119(e).

FIELD OF THE INVENTION

This invention relates generally to manage defects in mass storage devices, and more particularly to distributing the defect table on the recording medium of the mass storage device and caching the defect table.

BACKGROUND OF THE INVENTION

In conventional mass storage devices, a defect table of a fixed, predetermined size, length and/or capacity is stored on the recording medium of each storage device. The defect table indicates unreliable portions of the recording medium. During production of the mass storage device, the mass storage device is tested to determine which portions, if any, of the recording medium are not sufficiently reliable for writing and reading of data. The address of the each of the unreliable portions is stored on the recording medium in the defect table.

Furthermore, the size of the defect table on the recording medium in conventional mass storage device is predetermined, and fixed, regardless of how many actual defects are found during testing. When the number of defects is greater than the capacity of the defect table on the recording medium, the mass storage device is discarded as unusable because unreliable portions of the mass storage device will not be identified in the defect table on the recording medium.

During operation of conventional mass storage devices, the defect table on the recording medium is read and the entire defect table on the recording medium is cached in a defect table in memory on the microcontroller or microprocessor of the mass storage device. The defect table on the recording medium has a predetermined size because of the limited size of the defect table in memory. The cached defect table is referred to by the microcontroller or microprocessor to determine which portions of the recording medium not to use.

For example, when the microcontroller or microprocessor receives a write command, the microcontroller or microprocessor will determine that the addresses indicated in the cached defect table that will not be used for writing data. When the defect table on the recording medium is cached, the entire defect table on the recording medium of the fixed size is cached. However, when the entire defect table is cached, the limitation of the size of the cached defect table limits the size of the defect table on the recording medium. This has problems, in that when the number of defects on the recording medium is less than the capacity of the cached defect table, memory is unnecessarily reserved for the cached defect table. In addition, the cached defect table is not optimized or adapted to the application of the mass storage device or the quantity of defects on the recording medium.

Where the mass storage device is a disc drive, during operation of disc drive, for every disc access, the target address is expressed as logical block address (LBA). The LBA is converted to a physical address expressed as a physical cylinder/head/sector (PCHS) address based on the physical layout of the drive and the information in the defect table.

One conventional scheme of managing defect tables is the fixed-spares-per-track defect scheme (FSPT). In FSPT, each track is allocated a fixed amount of spares throughout the whole disc drive. Defective sectors are slipped using the spare sectors assigned to each track. Unused spares can be used to replace grown defects that may occur during the drive's lifetime. When a track has more defective sectors than the reserved spare sectors, some of the sectors are reassigned to another track using linear replacement method to achieve the same logical sectors per track. In LBA to physical block address (PBA) translation using FSPT, the translation is based on a logical zone table that describes the logical layout of the drive.

FIG. 1 is a block diagram of a table 100 of a physical zone layout according to the conventional FSPT scheme of managing defects. FIG. 2 is a block diagram of a table 200 of a logical zone layout according to the conventional FSPT scheme of managing defects.

The physical zone layout table 100 differs from the logical zone layout 200 in that one spare sector is reserved for every track. The conversion process from LBA to PCHS is accomplished by using the logical zone table 200 only as all logical zones are guaranteed a fixed number of sectors per zone.

FIG. 3 is a block diagram of a table 300 of track defects according to the conventional FSPT scheme of managing defects. During operation the entire defect table 300 is cached. The portions of the defect table 300 that correspond to, or are associated with, infrequently used or least recently used portions of the recording medium of mass storage device are cached. This is problematic in that infrequently used portions of the defect table 300 are cached. Therefore the cached defect table occupies more memory space than is typically useful.

The mass storage device is unusable when the defect table is larger than the defect buffer. During operation of the mass storage device, the cached version of the defect table (i.e. the defect buffer) will be updated when reliability problems are encountered with portions of the recording medium that are not identified by the defect table 300. The addresses of the grown defects of the recording medium will be added to the cached defect table. Later, the defect table 300 that stored on the recording medium will be updated with the cached defect table. However, if the quantity of defects stored in the defect table 300 on the recording medium is equal to the maximum capacity of the quantity of defects that can be cached, the mass storage device is rendered unusable.

Furthermore, seek times can be lengthy when a singular defect table is physically distant from some of the data on the recording medium. The singular defect table on the recording medium is stored in a reserved portion of the recording medium. During operation of the mass storage device, the seek time between accesses to the defect table and the regions of the recording medium that store data can be relatively lengthy because of the relatively large physical distance between the defect table in the reserved area and the data regions.

What is needed is a system, method and apparatus that enables a defect table on the storage medium that is adaptable and dynamic in size, capacity and length to accommodate the actual number of defects on the recording medium. What is also needed is a system, method and apparatus that enables a cached defect table that is adaptable and dynamic in size, capacity and/or length to the portions of the defect table that correspond to, or are associated with, frequently used or most recently used portions of the recording medium of mass storage device. What is also needed is a system, method and apparatus that provides a defect table on the recording medium of the storage device that has a larger capacity than the defect buffer. What is also needed is a system, method and apparatus that provides the defect table on the recording medium to be stored in a manner that reduces the seek time between the regions of data and the defect table. What is further needed is a system, method and apparatus that provides a defect table on the volatile memory device of the mass storage device that is adapted or optimized in reference to the application of the mass storage device and/or the quantity of defects on the recording medium.

SUMMARY OF THE INVENTION

The above-mentioned shortcomings, disadvantages and problems are addressed by the present invention, which will be understood by reading and studying the following specification.

The present invention provides systems and methods in which one or more segments of a defect table are copied to a volatile storage medium of a mass storage device from a recording medium of the mass storage device. The defect table in volatile memory is partitioned into a plurality of segments that are physically distributed throughout the recording medium. The defect table in volatile memory is also known as a defect buffer. The volatile storage medium is operably coupled to a microcontroller of the mass storage device. In one embodiment of the present invention, the defect table is stored in a manner that reduces the seek time between the regions of data and the defect table. In another embodiment, the defect table on the volatile memory medium is adapted and/or optimized in reference to the application of the mass storage device and/or the quantity of defects on the recording medium.

In one embodiment of the present invention, a defect table on a recording medium of a mass storage device is partitioned into a number of smaller segments. A fixed number of segments of the defect table that are associated with the most recently accessed data regions will be cached into a defect buffer in a volatile memory device of the mass storage device, therefore reducing the amount of capacity required to store or cache the defect table information in the volatile memory device. In a related embodiment of the present invention, the quantity and/or capacity of defect table segments on the recording medium and/or the quantity and/or capacity of defect table segments in the defect buffer is adapted to the quantity of defects found on the recording medium during a factory test process, or adapted to the application, such as multimedia, of the mass storage device. In another related embodiment, the partitioning of the defect table on the recording medium is in reference to the distribution of the defects on the recording medium of the mass storage device.

In another embodiment of the present invention, the capacity of the defect buffer is determined without reference to the quantity of the defects on the recording medium. In the example where the defect buffer capacity is less than the quantity of defects on the recording medium, a scheme is implemented to manage the swapping of defect entries in and out of the defect buffer from the defect table on the recording medium. One example of such a scheme is a most-recently-used scheme.

In yet another embodiment of the present invention, a method for managing a defect table of a mass storage device includes obtaining the defect table from the recording medium of the mass storage device, and copying a portion of the defect table into a volatile storage medium.

Still another embodiment of the present invention is a method for managing a defect table that is partitioned into a quantity of one or more segments. The capacity of the partitioned defect table is determined to be bigger than the capacity of the defect buffer. Subsequently, one or more segments of the defect table that are within the capacity of the defect buffer are copied into the defect buffer in the volatile storage medium.

In still yet another embodiment of the present invention, a method includes obtaining the application, such as multimedia, of the mass storage device, and adapting the capacity of the defect buffer to the application.

In still yet a further embodiment of the present invention, a method includes obtaining the quantity of defects on the recording medium, such as multimedia, of the mass storage device, and adapting the capacity of the defect buffer to the quantity of defects on the recording medium.

The present invention describes systems, methods, and computer-readable media of varying scope. In addition to the embodiments and advantages of the present invention described in this summary, further embodiments and advantages of the invention will become apparent by reference to the drawings and by reading the detailed description that follows.

BRIEF DESCRIPTION OF THE DRAWINGS

FIG. 1 is a block diagram of a table of a physical zone layout according to a conventional fixed-spares-per-track scheme of managing defects.

FIG. 2 is a block diagram of a table of a logical zone layout according to a conventional fixed-spares-per-track scheme of managing defects.

FIG. 3 is a block diagram of a table of track defects according to a conventional fixed-spares-per-track scheme of managing defects.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

The invention described in this application is useful for all types of disc drives, including hard-disc drives, optical drives (such as CDROMs), ZIP drives, floppy-disc drives, and any other type of drive.

The detailed description is divided into four sections. In the first section, a system level overview of the invention is presented. In the second section, methods for an embodiment of the invention are provided. In the third section, apparatus of the invention is described. Finally, in the fourth section, a conclusion of the detailed description is provided.

System Level Overview

Figure 4:
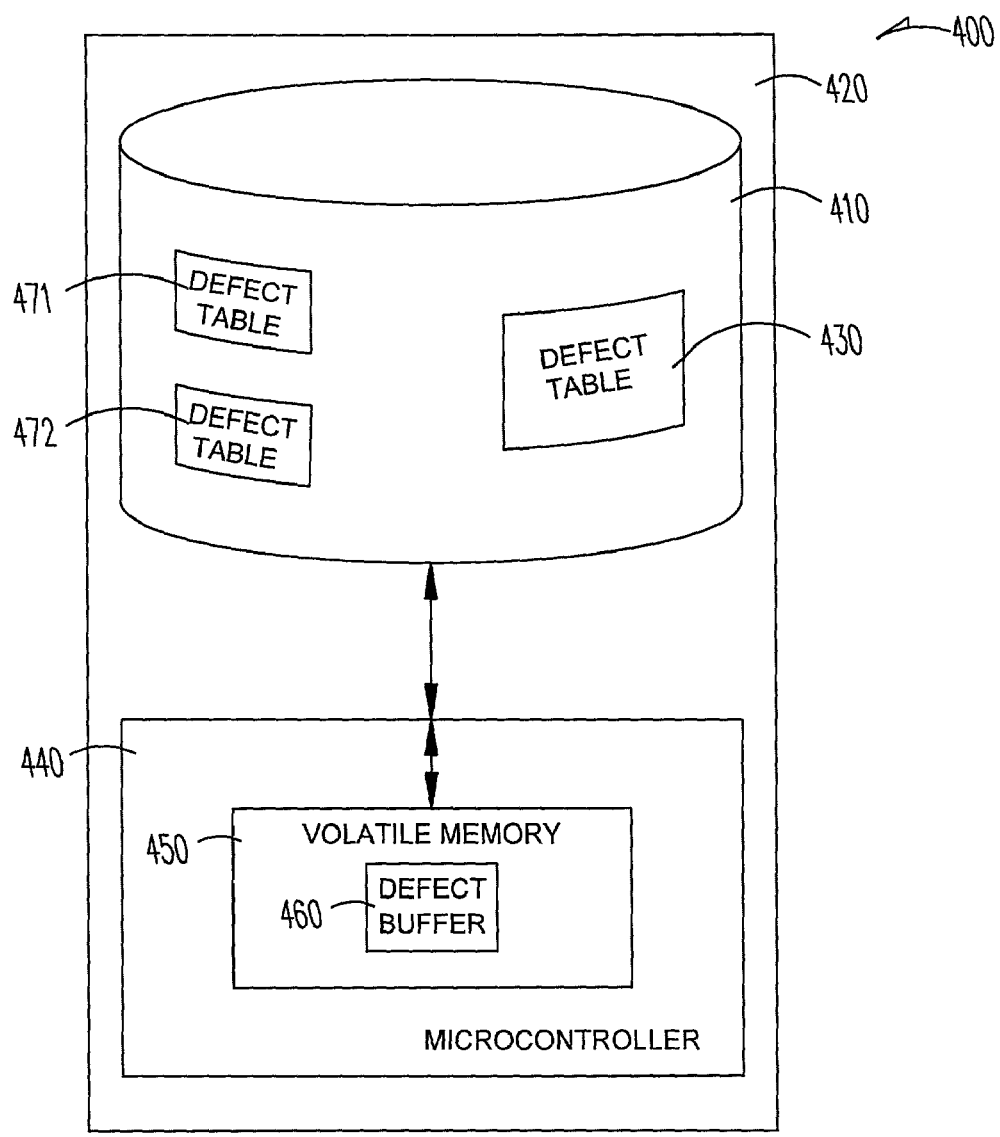
FIG. 4 is a block diagram that provides a system level overview of the operation of embodiments of the present invention for managing defects.

FIG. 4 is a block diagram that provides a system level overview 400 of the operation of embodiments of the present invention. Embodiments of the invention operate in a multi-processing, multi-threaded operating environment on a computer, such as computer 2000 in FIG. 20.

System 400 includes a recording medium 410 on a mass storage device 420. The recording medium 410 includes a defect table 430. The mass storage device 420 also includes a microcontroller 440 operably coupled to the recording medium 410. The mass storage device 420 also includes a volatile memory device 450 operably coupled to the microcontroller 440. The volatile memory device 450 further includes a portion identified as a defect buffer 460 for the defect table 430. The defect buffer 460 is used by the microcontroller 440 to determine if particular portions of the recording medium 410 are associated with a defect that would prohibit use of the particular portions.

In one embodiment of the present invention, the size of the defect buffer 460 and the defect table 430 are not dependent upon the size of each other. In varying embodiments, the size of the defect buffer 460 is greater than, less than, or equal to, the size of the defect table 430.

In one embodiment of particular interest, the size of the defect buffer 460 is less than the size of the defect table 430. In this embodiment, the defect buffer 460 contains a portion or subset of the items in the defect table 430. This embodiment solves the problem in the prior art of limiting the size of the defect table 430 to no greater than the size of the defect buffer 460. This embodiment also provides the advantage of enabling a larger defect table 430 than would otherwise be possible, which in turn, enables mass storage devices with a relatively large quantity of defects to be usable. This embodiment also provides the advantage of enabling a defect buffer 460 with a relatively small size in comparison to the defect table 430.

In another embodiment of the present invention, the defect table 430 is divided or segmented into a plurality of defect tables, such as defect tables 471 and 472. This embodiment also provides the advantage of enabling defect tables that are distributed throughout the recording medium, such as a defect that is distributed in close physical location to the data region that the defect table is associated with.

Figure 19:
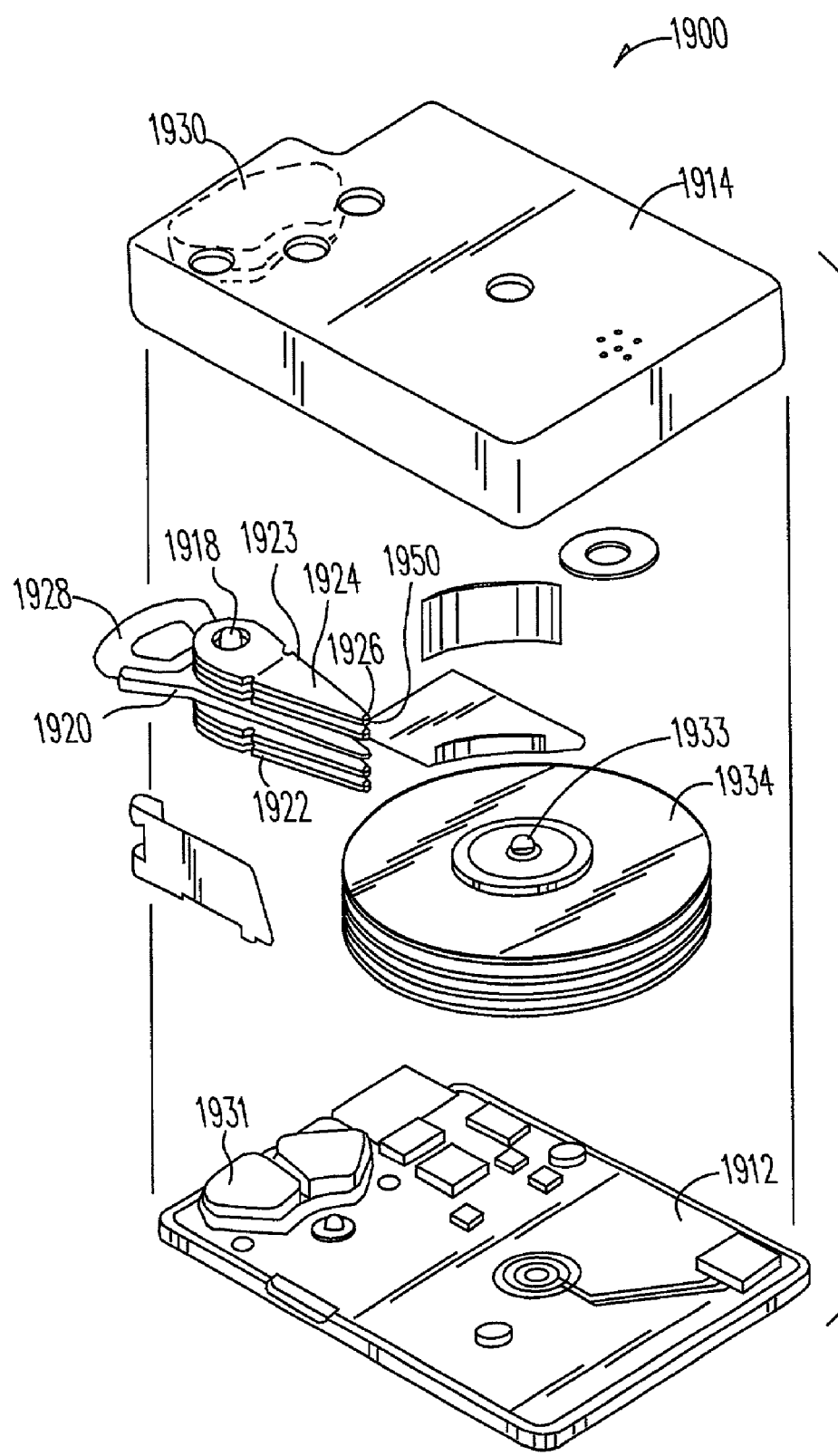
FIG. 19 is an exploded view of one embodiment of a disc drive of the present invention.

In one example, the mass storage device 420 is a disc drive, such as magnetic disc drive 1900 in FIG. 19.

Description of the Preferred Embodiment

Figure 5:
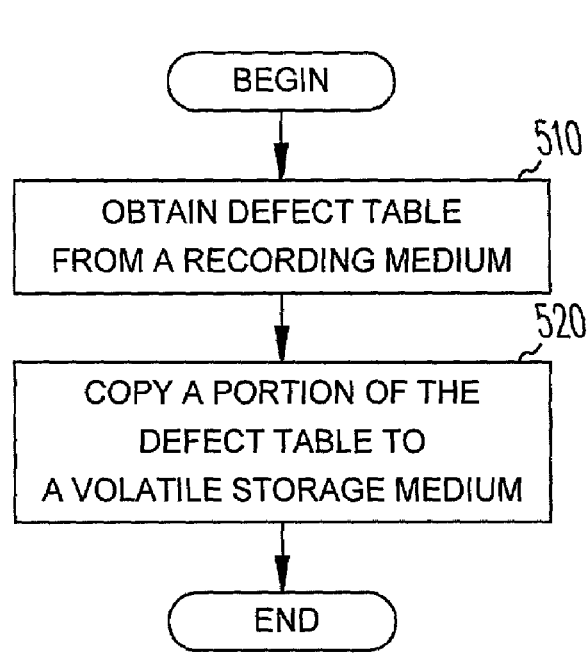
FIG. 5 is a flowchart of a method for managing a defect table of a mass storage device, according to an embodiment of the invention.

FIG. 5 is a flowchart of a method 500 for managing a defect table 430 of a mass storage device 420, according to an embodiment of the invention. Method 500 includes obtaining 510 the defect table 430 from the recording medium 410 of the mass storage device 420. Subsequently, method 500 includes copying 520 a portion of the defect table 430 into a defect buffer 460 in a volatile storage medium 450. In one embodiment, obtaining the defect table 430 is reading the defect table 430. The volatile storage medium 450 is operably coupled to a microcontroller 440 and/or a microprocessor of the mass storage device 420. In one embodiment, the mass storage device 420 is a disc drive, such as disc drive 1900 in FIG. 19. In another embodiment, the volatile storage medium 450 is a cache. In further embodiments, volatile storage medium is random access memory (RAM).

In method 500, a portion of the defect table 430 is copied into the volatile storage medium 450. As a result, method 500 solves the problem in the prior art of limiting the size of the defect table 430 to no greater than the size of the defect buffer 460. This embodiment also provides the advantage of enabling a larger defect table 430 than would otherwise be possible, which in turn enables mass storage devices 420 with a relatively large quantity of defects to be usable. This embodiment also provides the advantage of enabling a defect buffer 460 with a relatively small size in comparison to the defect table 430.

The volatile storage medium 450 is operably coupled to a microcontroller 440 and/or a microprocessor of the mass storage device 420. In one embodiment, the mass storage device 420 is a disc drive, such as disc drive 1900 in FIG. 19. In another embodiment, the volatile storage medium 450 is a cache.

Figure 6:
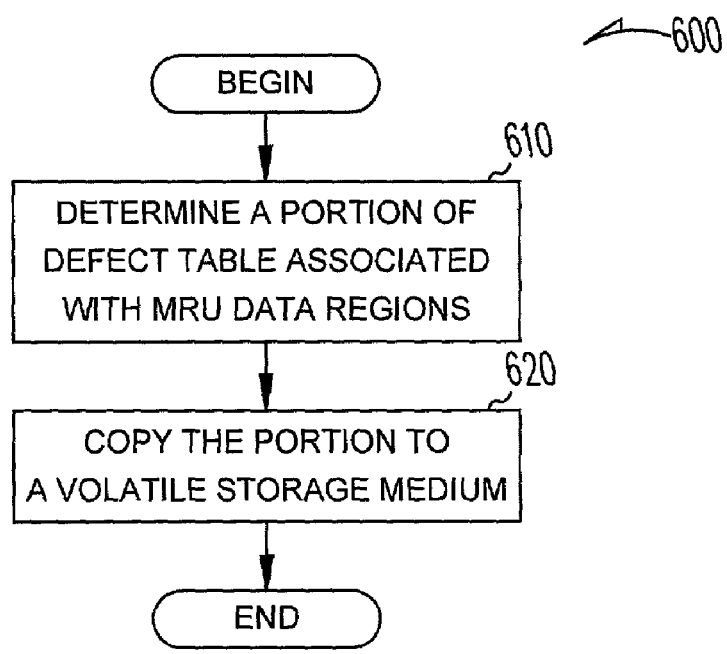
FIG. 6 is a flowchart of a method of an embodiment of copying one or more defect table entries that are most likely to be referenced again to a volatile memory device of the mass storage device.

FIG. 6 is a flowchart of a method 600 of an embodiment of the copying 520 in FIG. 5 in which one or more defect table segments that are most likely to be referenced again are copied to a volatile memory device of the mass storage device. Method 600 includes determining 610 at least one of a plurality of portions of the defect table 430 that are associated with the most recently used (MRU) plurality of data regions of recording medium 410 of the mass storage device 420. Method 600 also includes copying 620 at least one of the plurality of the MRU portions into the volatile storage medium 450.

Method 600 improves the usefulness of the defect buffer 460 by copying the defect segments that are most likely to be referenced again. Thus a defect buffer 460 that stores defect segments that are most likely to be used can be reduced in capacity and size. As a result, method 600 solves the problem in the prior art of limiting the defect buffer 460 to at least the capacity of the defect table 430.

Figure 7:
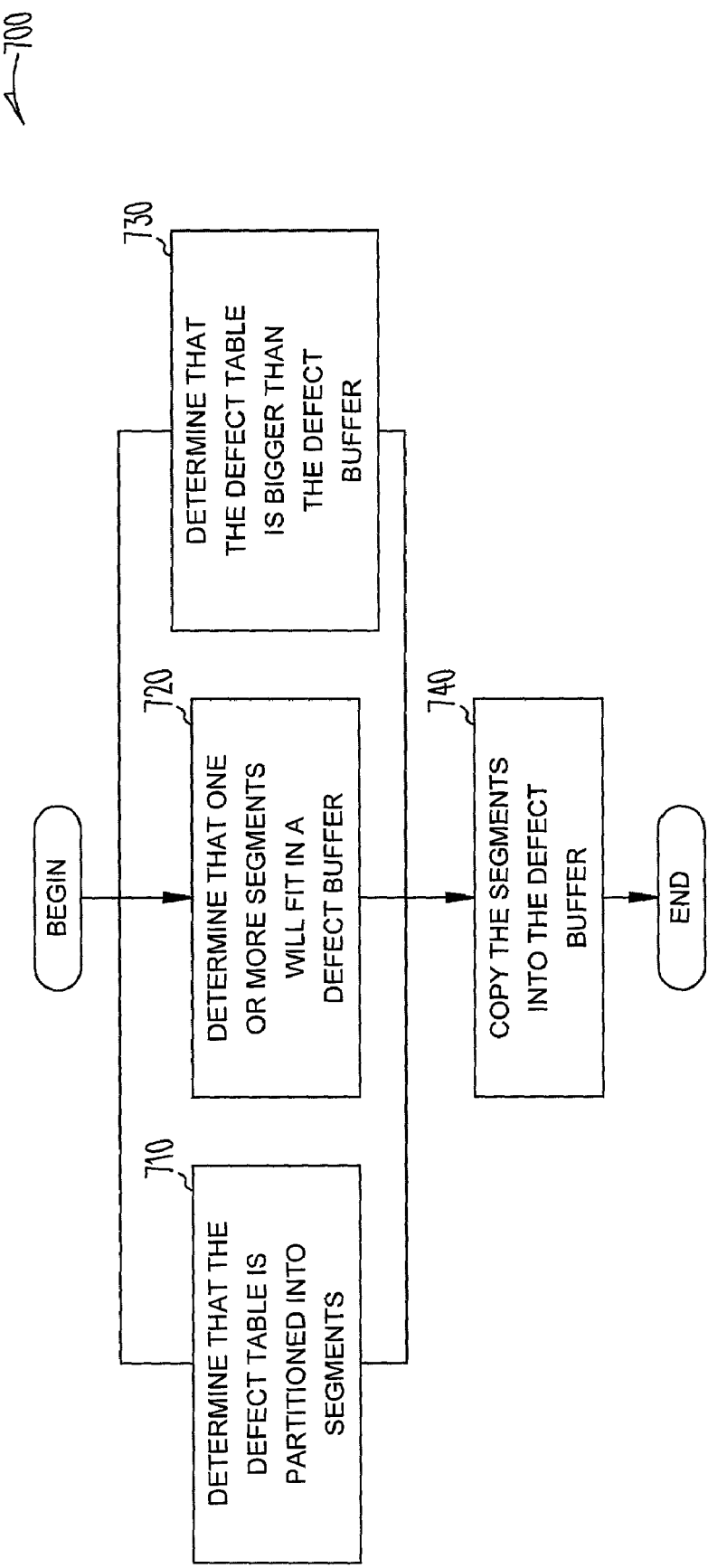
FIG. 7 is a flowchart of a method of an embodiment of copying a defect table to a volatile memory device of the mass storage device that enables the defect table on a recording medium of a storage device that has a larger capacity than a defect buffer.

FIG. 7 is a flowchart of a method 700 of an embodiment of the copying 520 in FIG. 5 that enables a defect table on the recording medium of the storage device that has a larger capacity than the defect buffer. Method 700 includes determining 710 that the defect table is partitioned into a quantity of one or more segments. In a further embodiment, the segments are of equal size. In yet a further embodiment, the one or more segments are physically distributed throughout the recording medium. In addition, method 700 includes determining 720 that one or more segments will fit in a defect buffer, wherein the size and/or capacity of a portion and/or subset of the one or more segments is not greater than the predetermined and/or allocated size of the defect table in a volatile storage medium. Furthermore, method 700 also includes determining 730 that the defect table is bigger than the defect buffer, wherein the size of the defect table is greater than the predetermined and/or allocated size of a defect buffer in the volatile storage medium.

Thereafter, method 700 includes copying 740 the portion of the one or more segments of the defect table into the defect buffer in the volatile storage medium. Method 700 solves the need in the prior art for a system, method and/or apparatus that provides a defect table on the recording medium of the storage device that has a larger capacity than the defect buffer. The defect buffer is also known as a defect table buffer.

Figure 8:
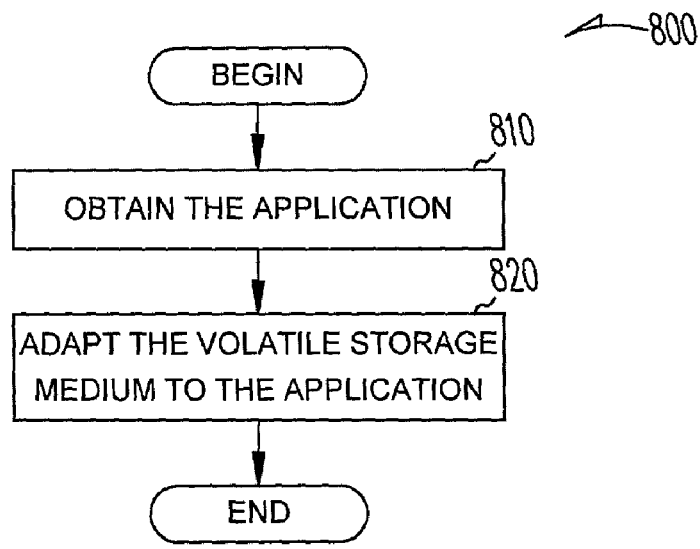
FIG. 8 is a flowchart of a method of an embodiment of a method of further steps to FIG. 5 where the volatile storage medium is partitioned into a quantity of one or more segments based on an application of the mass storage device.

FIG. 8 is a flowchart of a method 800 of an embodiment of a method of further steps to method 500 where the volatile storage medium is partitioned into a quantity of one or more segments based on an application of the mass storage device. Method 800 includes obtaining 810 the application of the mass storage device. Method 800 also includes adapting 820 the quantity of the one or more segments of the volatile memory device to the application. For instance, to enable four simultaneous I/O streams for an audio/video application, the number of cache segments can be set at four. For this instance, the cache segment size is sixteen kilobytes, which at four bytes per defect entry, can store up to four thousand defect entries.

Method 800 satisfies the need in the prior art for a system, method and/or apparatus that provides a defect table on the volatile memory device of the mass storage device that is adapted or optimized in reference to the application of the mass storage device.

Figure 9:
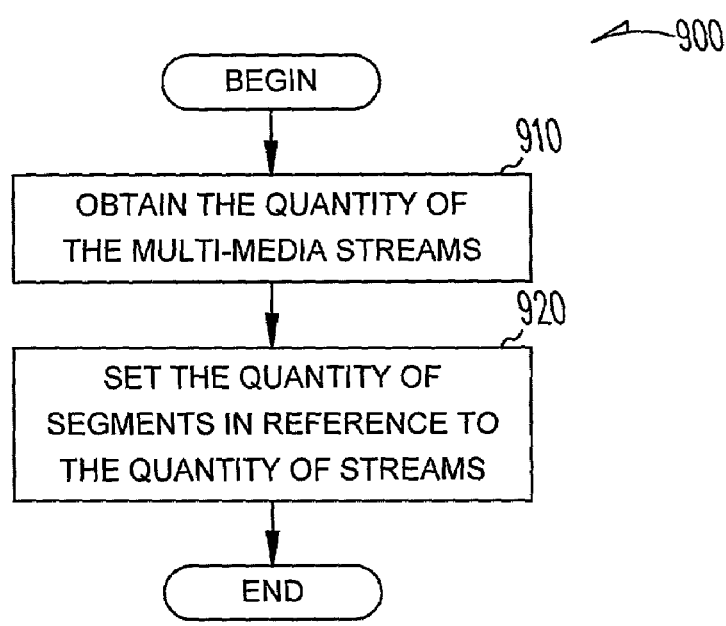
FIG. 9 is a flowchart of a method of an embodiment of adapting the defect table in volatile memory in which the application is a multimedia application.

FIG. 9 is a flowchart of a method 900 of an embodiment of the adapting 820 in FIG. 8 in which the application is a multimedia application. Method 900 includes obtaining 910 the quantity of simultaneous multimedia streams. Method 900 also includes setting 920 the quantity of the one or more segments in reference to the quantity of simultaneous multimedia streams. Method 900 satisfies the need in the prior art for a system, method and/or apparatus that provides a defect table on the volatile memory device of the mass storage device that is adapted or optimized in reference to the application of the mass storage device.

Figure 10:
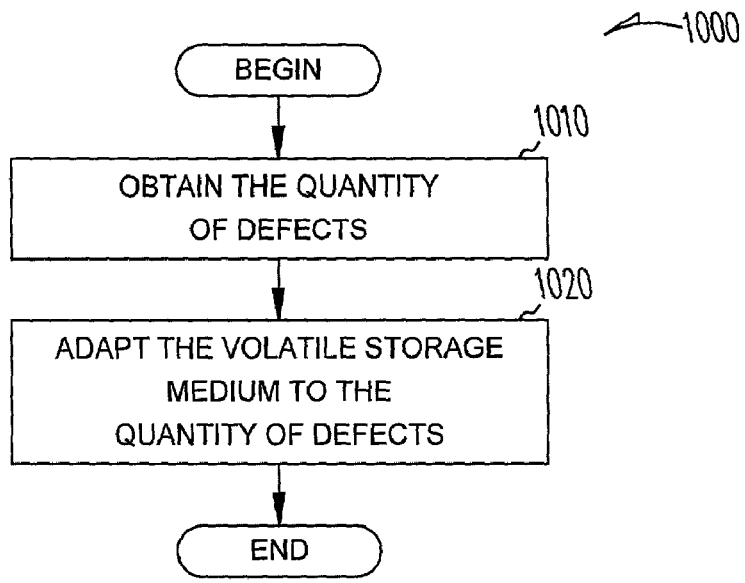
FIG. 10 is a flowchart of a method of further steps to FIG. 5 where the volatile storage medium is partitioned into a quantity of one or more segments based on a quantity of defects of the mass storage device.

FIG. 10 is a flowchart of a method 1000 of further steps to method 500 where the volatile storage medium is partitioned into a quantity of one or more segments based on the quantity of defects of the mass storage device. Method 1000 includes obtaining 1010 the quantity of defects found during a manufacturing test process of the mass storage device. Method 1000 also includes adapting 1020 the quantity of the one or more segments to the quantity of defects. Method 1000 satisfies the need in the prior art for a system, method and/or apparatus that provides a defect table on the volatile memory device of the mass storage device that is adapted or optimized in reference to the quantity of defects on the recording medium.

Figure 11:
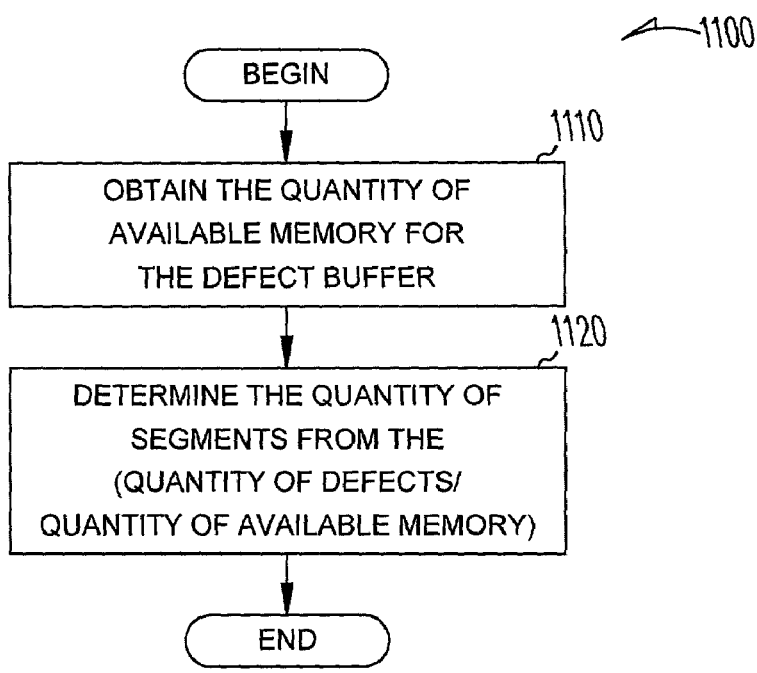
FIG. 11 is a flowchart of a method of an embodiment of the adapting in FIG. 10.

FIG. 11 is a flowchart of a method 1100 of an embodiment of the adapting 1020 in FIG. 10. Method 1100 includes obtaining 1110 the quantity of available memory for storing the defect table in the volatile memory device. Method 1100 also includes determining 1120 the quantity of the one or more segments from the quantity of defects divided by the quantity of available memory. Method 1100 satisfies the need in the prior art for a system, method and/or apparatus that provides a defect table on the volatile memory device of the mass storage device that is adapted or optimized in reference to the quantity of defects on the recording medium.

Table 1 below shows an example of a defect table 430 that is partitioned into smaller segments, 471 and 472, according to its coverage of data regions. Note that the size of the different defect zones are not necessarily equal. The size of the defect zones are dependent on the number of defect entries in the defect table segment. The number of defect entries per defect table segment is constant to facilitate caching.

TABLE 1

| Defect Table Segment | Data Region |
| --- | --- |
| 0 | Cylinder 0–1050 |
| 1 | Cylinder 1051–3011 |
| 2 | Cylinder 3012–4320 |
| 3 | Cylinder 4321–5399 |
| 4 | Cylinder 5400–6429 |
| 5 | Cylinder 6430–9599 |
| 6 | Cylinder 9600–10698 |
| 7 | Cylinder 10699–12799 |

In Table 1, the most recently accessed data regions, as in method 600 in FIG. 6, are within cylinder 0–1050, cylinder 3021–4320, cylinder 5400–6429, and cylinder 9600–10698 of a disc drive, such as disc drive 1900 in FIG. 19. Only defect table segments 0, 2, 4 and 6 will be cached into the defect buffer. If any disc access occurs outside of these four regions, the least frequently used defect table segment will be flushed out of the defect buffer and replaced by the defect table segment that covers the newly accessed data region.

This approach is optimal for audio and video data storage applications, as in method 800 in FIG. 8 and method 900 in FIG. 9, whereby the data access pattern is more predictable and localized. For example, there can be a maximum of four constant data streams being read from or written to the disc drive in a sequential manner. If all the four required defect table segments are cached into the defect buffer, this would minimize flushing of the cache.

Figure 12:
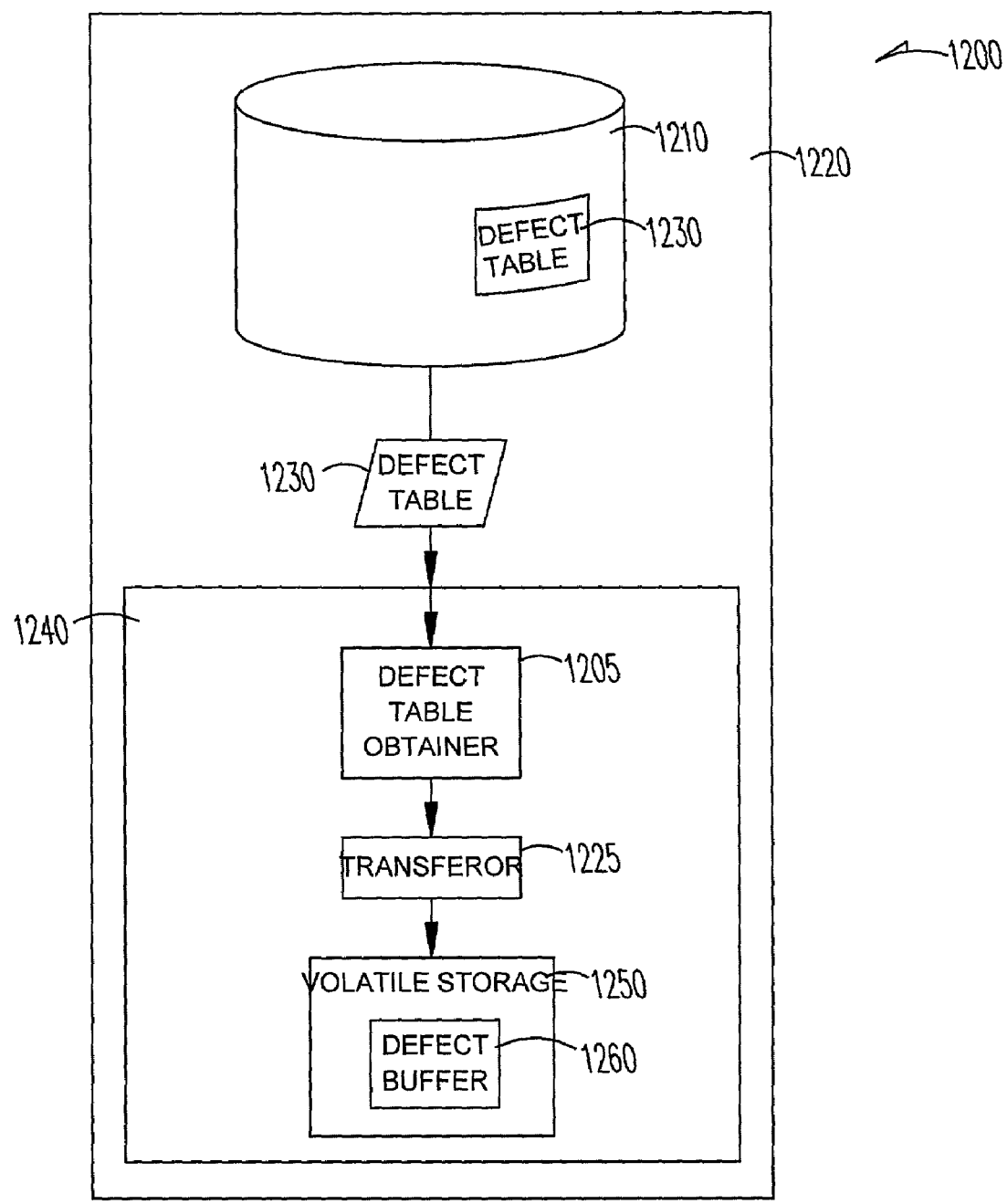
FIG. 12 is a block diagram of an apparatus to manage a defect table of a mass storage device, according to an embodiment of the invention.

FIG. 12 is a block diagram of an apparatus 1200 to manage a defect table 1230 of a mass storage device 1220, according to an embodiment of the invention. Apparatus 1200 includes an obtainer 1205 of the defect table 1230 from the recording medium 1210 of the mass storage device 1220. The obtainer 1205 obtains the defect table 1230 from the recording medium 1210. The obtainer 1205 is operably coupled to the recording medium 1210. In one embodiment, the obtainer 1205 of the defect table 1230 is a reader of the defect table 1230.

In addition, apparatus 1200 includes a transferor 1225 of a portion of the defect table 1230 into a defect buffer 1260. The transferor 1225 is operably coupled to the obtainer 1205. The defect buffer 1260 is in a volatile storage medium 1250.

The volatile storage medium 1250 is operably coupled to a microcontroller 1240 and/or a microprocessor of the mass storage device 1220. In one embodiment, the mass storage device 1220 is a disc drive, such as disc drive 1900 in FIG. 19. In another embodiment, the volatile storage medium 1250 is a cache memory. In some embodiments, the cache memory is a cache selected from a group consisting of an associative cache, a first-in-first-out cache (FIFO), a multi-level cache, a single level cache, a chained cache, and a linked list cache.

In apparatus 1200, a portion of the defect table 1230 is transferred into the defect buffer 1260. Because only a portion of the defect table 1230 is transferred, apparatus 1200 solves the problem in the prior art of limiting the size of the defect table 1230 to no greater than the size of the defect buffer 1260. Therefore, apparatus 1200 also provides the advantage of enabling a larger defect table 1230 than would otherwise be possible, which in turn, enables mass storage devices 1220 with a relatively large quantity of defects to be usable. This embodiment also provides the advantage of providing a defect buffer 1260 with a relatively small size in comparison to the defect table 1230.

Figure 13:
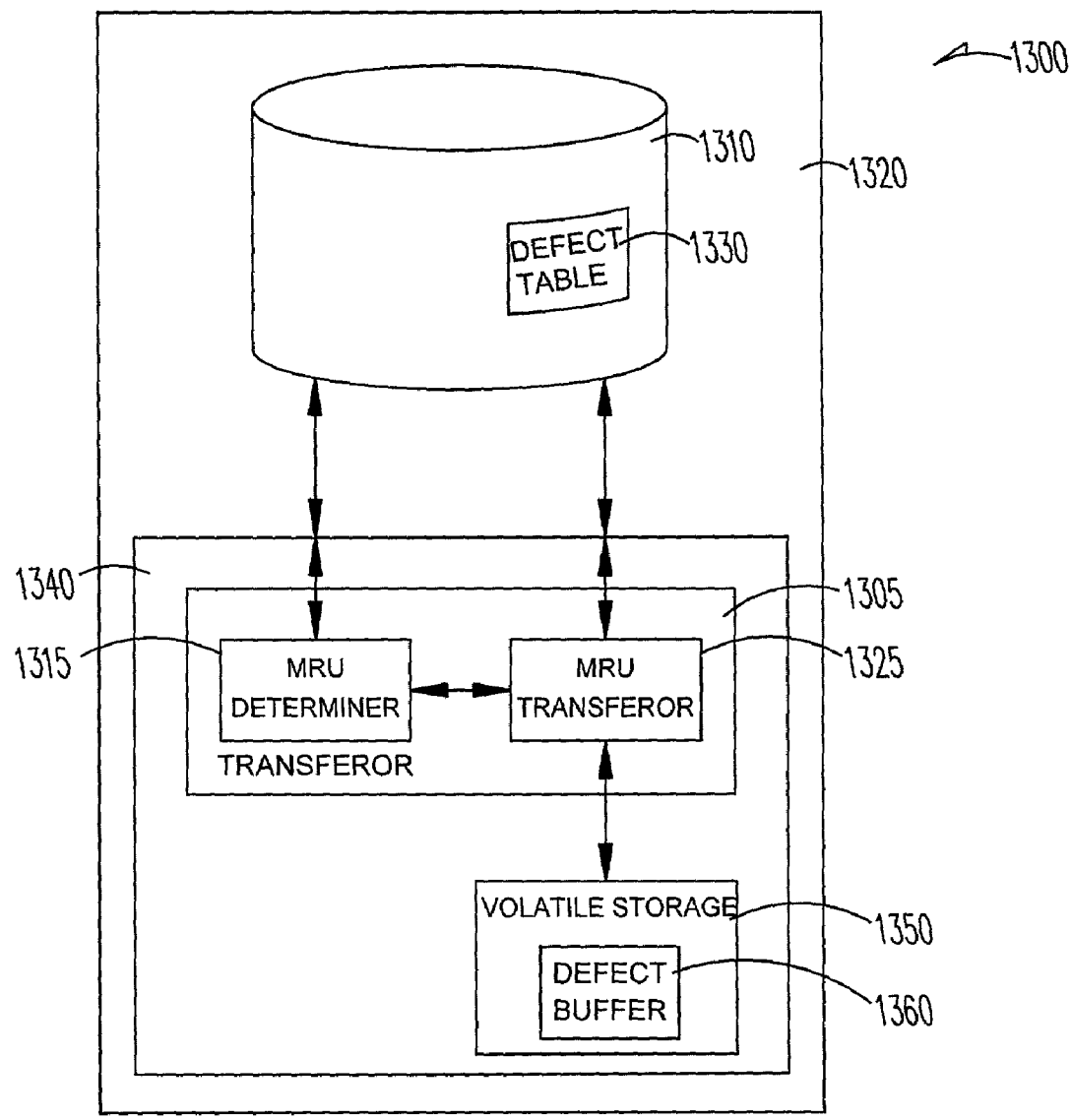
FIG. 13 is a block diagram of an apparatus that includes an embodiment of the transferor in FIG. 12, of one or more MRU portions of a defect table into a defect buffer in a volatile storage medium.

FIG. 13 is a block diagram of an apparatus 1300 that includes an embodiment of the transferor 1220 in FIG. 12, in which at least one of the plurality of the most-recently-used (MRU) portions of the defect table 1330 are transferred into the defect buffer 1360 in the volatile storage medium. Defect table 1330 is substantially similar to defect table 430 in FIG. 4 and defect table 1230 in FIG. 12. Transferor 1305 includes a determiner 1315 of at least one of a plurality of portions of the defect table 1330 that are associated with the MRU plurality of data regions of recording medium 1310 of the mass storage device 1320. The determiner 1315 is operably coupled to the defect table 1330 on the recording medium 1310.

Transferor 1305 also includes a transferor 1325 of at least one of the plurality of the MRU portions of the defect table 1330 into the defect buffer 1360 in the volatile storage medium 1350. The transferor 1325 is operably coupled to the determiner 1315, the defect table 1330, and the defect buffer 1360.

Apparatus 1300 improves the usefulness of the defect buffer 1360 by transferring the defect entries that are most likely to be referenced again, from the defect table 1330 to the defect buffer 1360. Thus, a defect buffer 1360 that stores defect entries that are most likely to be used, can be reduced in capacity and size. As a result, apparatus 1300 solves the problem in the prior art of enlarging the defect buffer 1360 to at least the capacity of the defect table 1330, which enables a defect buffer 1360 of relatively smaller size, and a defect table 1330 of relatively larger size.

Figure 14:
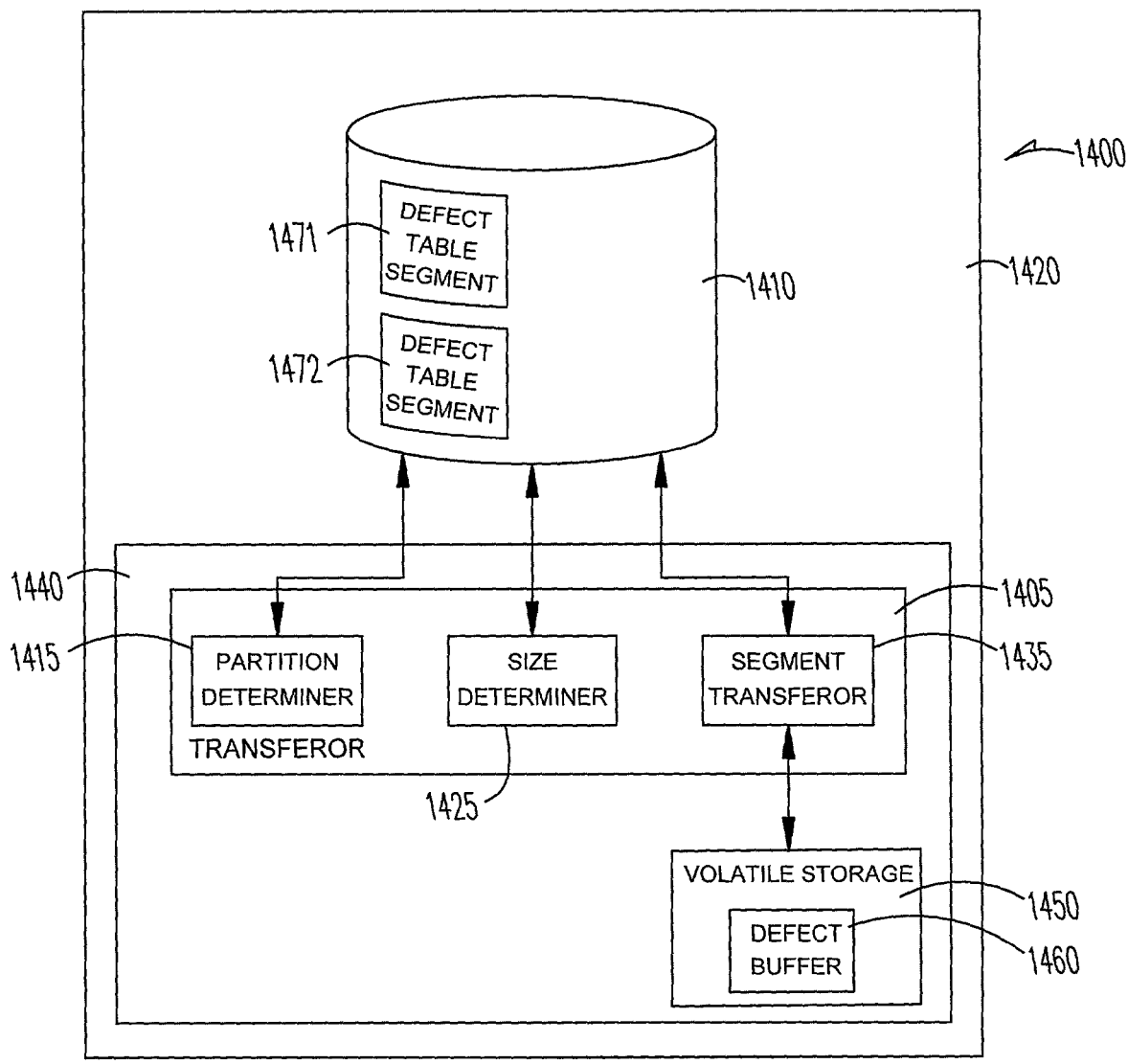
FIG. 14 is a block diagram of an apparatus that includes an embodiment of the transferor in FIG. 12 that supports a defect table on a recording medium of a storage device having a larger capacity than a defect buffer.

FIG. 14 is a block diagram of an apparatus 1400 that includes an embodiment of the transferor 1220 in FIG. 12 that enables a defect table on a recording medium of a storage device having a larger capacity than a defect buffer. Transferor 1405 includes a partition determiner 1415 that determines that the defect table, such as defect table 1330 in FIG. 13, on the recording medium 1410 is partitioned into a quantity of one or more segments, 1471 and 1472. In a further embodiment of apparatus 1400, the segments are of equal size. In yet a further embodiment, the one or more segments, 1471 and 1472, are physically distributed throughout the recording medium 1410 in locations that are close to the data that the segments are associated with. For example, in reference to Table 1, defect table segment 4 is stored on cylinder 5400 & 6430 and defect table segment 6 is stored on cylinder 9600 & 10699 respectively.

Partition determiner 1415 is operably coupled to the recording medium 1410. Furthermore, transferor 1405 also includes a size determiner 1425 that determines that the defect table, such as defect table 1330 in FIG. 13 is bigger than the defect buffer 1460, wherein the size of the defect table 1330 is greater than the predetermined and/or allocated size of the defect buffer 1460 in the volatile storage medium 1450. Size determiner 1425 is operably coupled to the recording medium 1410.

Thereafter, transferor 1405 includes a segment transferor 1435 that transfers the portion of the one or more segments, 1471 and 1472, of the defect table into the defect buffer 1460 in the volatile storage medium 1450. Segment transferor 1435 is operably coupled to the recording medium 1410, the partition determiner 1415, and the size determiner 1425.

Apparatus 1400 solves the need in the prior art for a system, method and/or apparatus that enables a defect table on the recording medium 1410 of the storage device 1420 that has a larger capacity than the defect buffer 1460.

Figure 15:
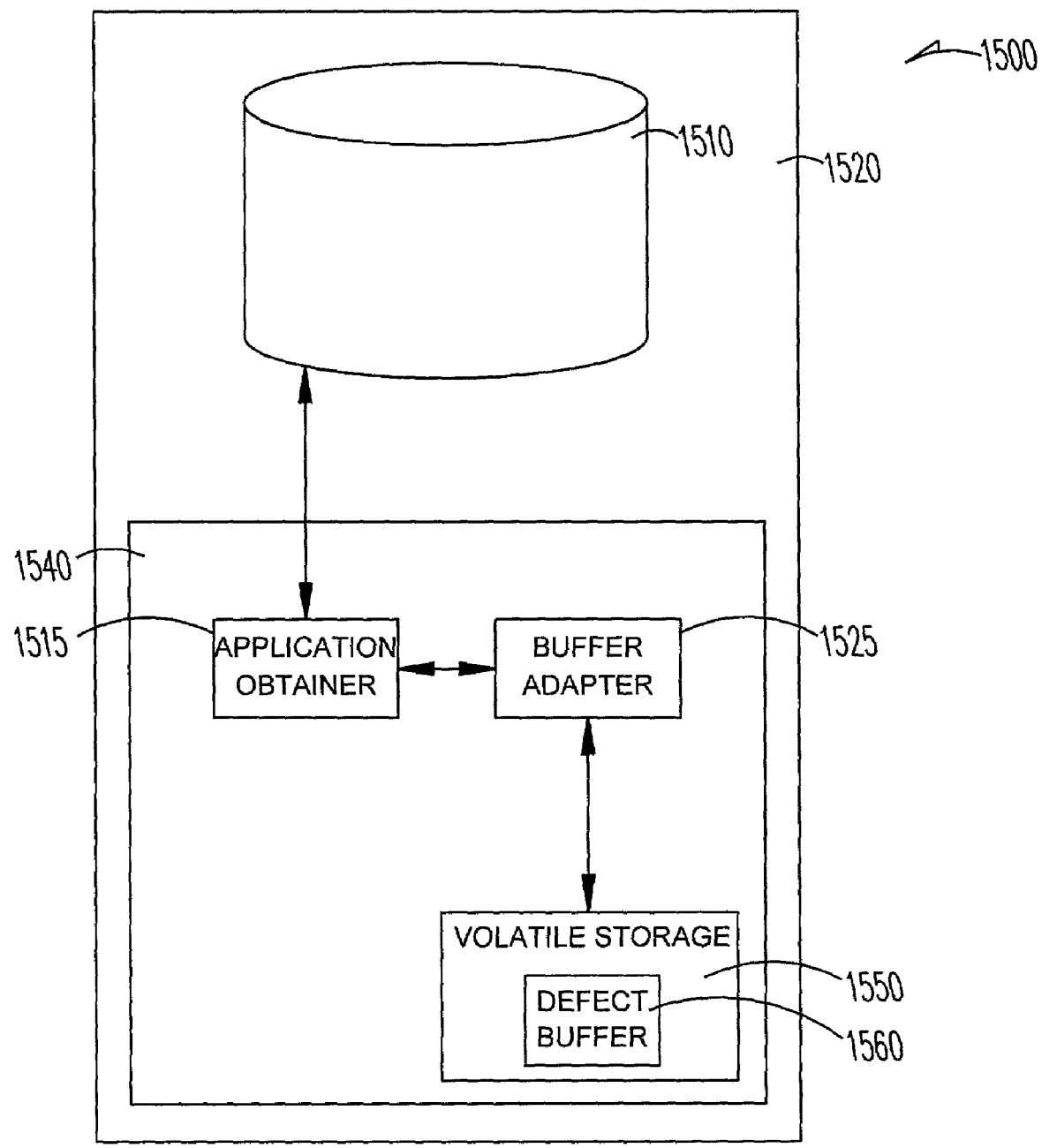
FIG. 15 is a block diagram of an apparatus that includes apparatus components that are additional to apparatus in FIG. 12, where the defect buffer in the volatile storage medium is partitioned into a quantity of one or more segments.

FIG. 15 is a block diagram of an apparatus 1500 that includes apparatus components that are additional to apparatus 1200 in FIG. 12, where the defect buffer 1560 in the volatile storage medium 1550 is partitioned into a quantity of one or more segments. Apparatus 1500 includes an obtainer 1515 of the application of the mass storage device 1500. The obtainer 1515 obtains an indication of the type of application from a source, such as the reserved portion of the recording medium 1510.

Apparatus 1500 also includes an adapter 1525 of the quantity of the one or more segments of the defect buffer 1560 in the volatile memory device 1550 to the application. For instance, to enable four simultaneous I/O streams for and audio/video application, the number of cache segments in the defect buffer 1560 is be set to four. For this case, the cache segment size is sixteen kilobytes, which at four bytes per defect entry, can store up to four thousand defect entries. The adapter 1525 is operably coupled to the obtainer 1515 and the defect buffer 1560.

Apparatus 1500 satisfies the need in the prior art for a system, method and/or apparatus that provides a defect buffer 1560 on the volatile memory device 1550 of the mass storage device 1520 that is adapted or optimized in reference to the application of the mass storage device 1520.

Figure 16:
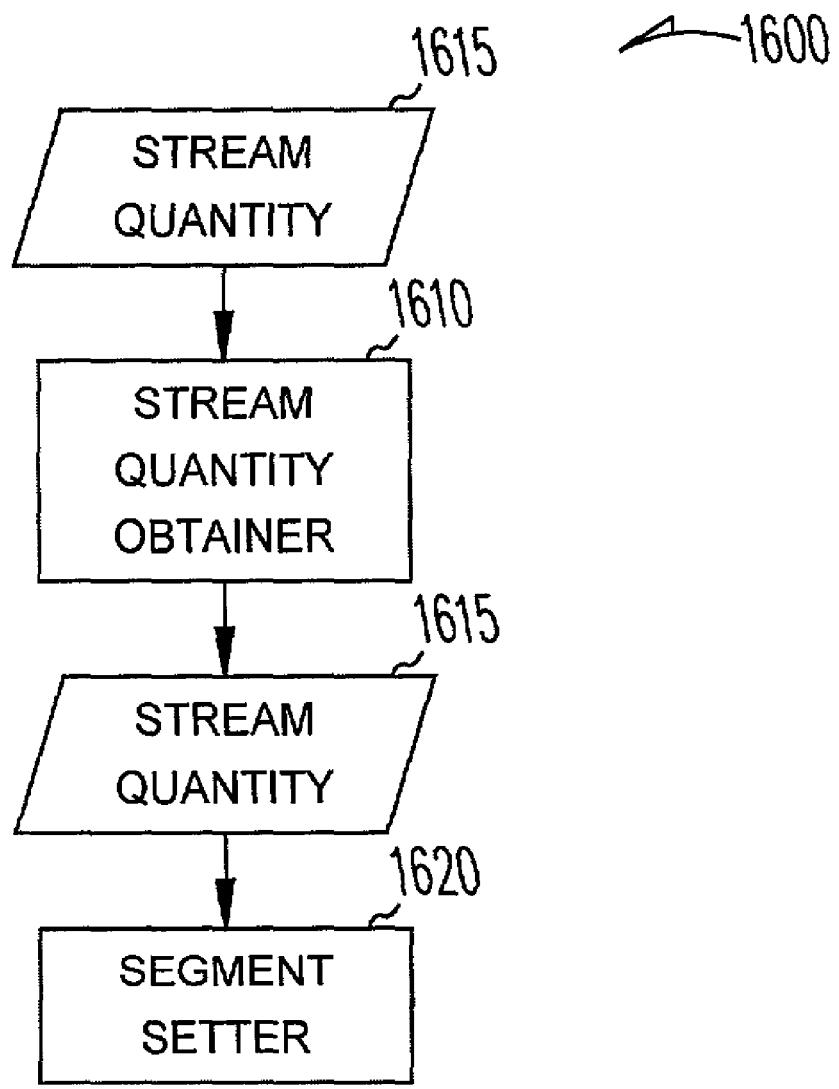
FIG. 16 is a block diagram of an apparatus of an embodiment of the adapter in FIG. 15 in which the application is a multimedia application.

FIG. 16 is a block diagram of an apparatus 1600 of an embodiment of the adapter 1525 in FIG. 15 in which the application is a multimedia application. Apparatus 1600 includes an obtainer 1610 of the quantity 1615 of simultaneous multimedia streams. Apparatus 1600 also includes a setter 1620 of the quantity of the one or more segments in reference to the quantity of simultaneous multimedia streams. Apparatus 1600 satisfies the need in the prior art for a system, method and/or apparatus that provides a defect table on the volatile memory device of the mass storage device that is adapted or optimized in reference to the application of the mass storage device.

Figure 17:
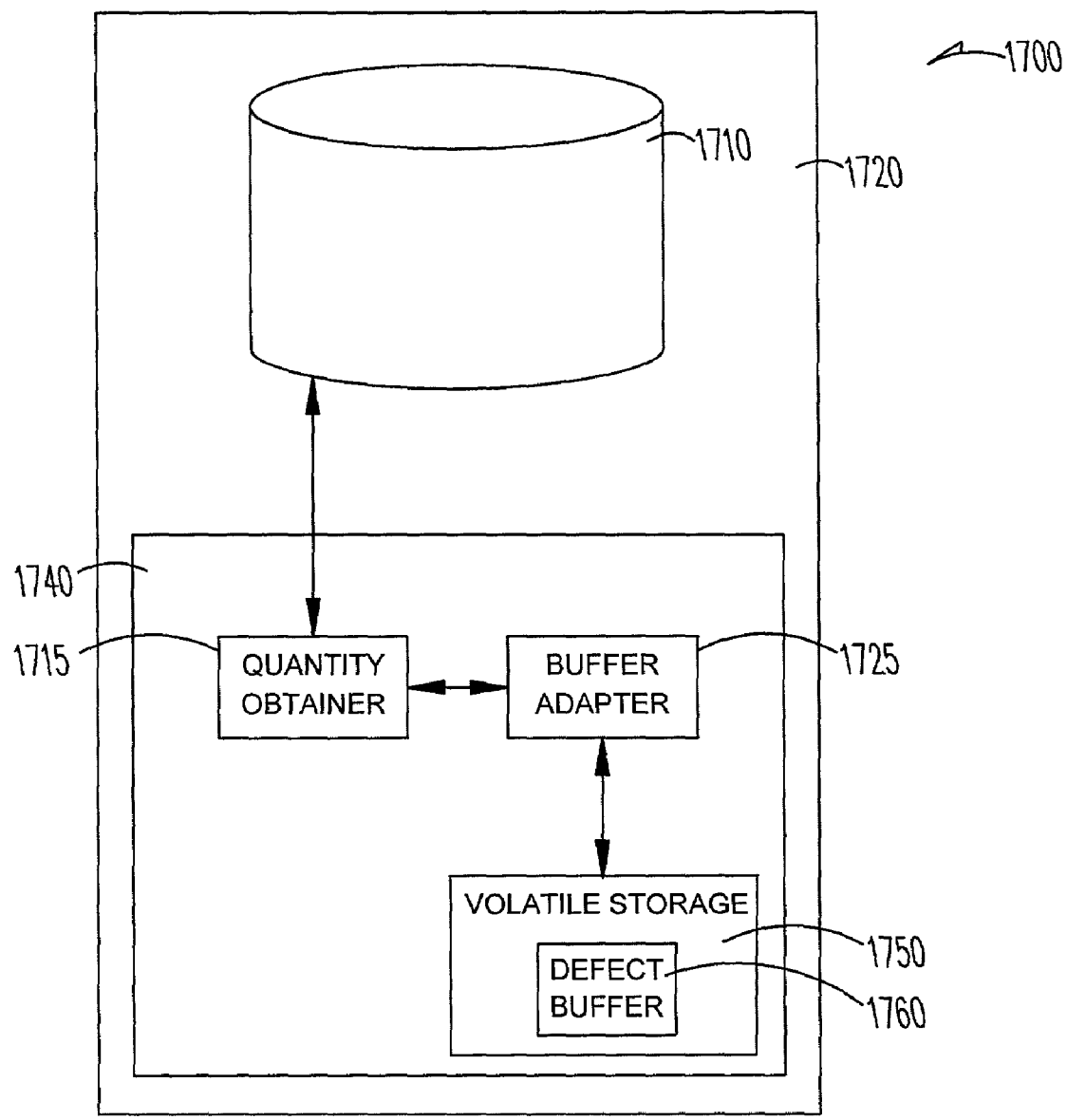
FIG. 17 is a block diagram of an apparatus that includes apparatus components that are additional to apparatus in FIG. 12, where the defect buffer in the volatile storage medium is partitioned into a quantity of one or more segments.

FIG. 17 is a block diagram of an apparatus 1700 that includes apparatus components that are additional to apparatus 1200 in FIG. 12, where the defect buffer 1760 in the volatile storage medium 1750 is partitioned into a quantity of one or more segments. Apparatus 1700 includes an obtainer 1715 of the quantity of defects found during a manufacturing test process of the mass storage device 1720. Apparatus 1700 also includes an adapter 1725 of the quantity of the one or more segments in the defect buffer 1760 to the quantity of defects. Apparatus 1700 satisfies the need in the prior art for a system, method and/or apparatus that provides a defect buffer 1760 on the volatile memory device 1750 of the mass storage device 1720 that is adapted or optimized in reference to the quantity of defects on the recording medium 1710.

Figure 18:
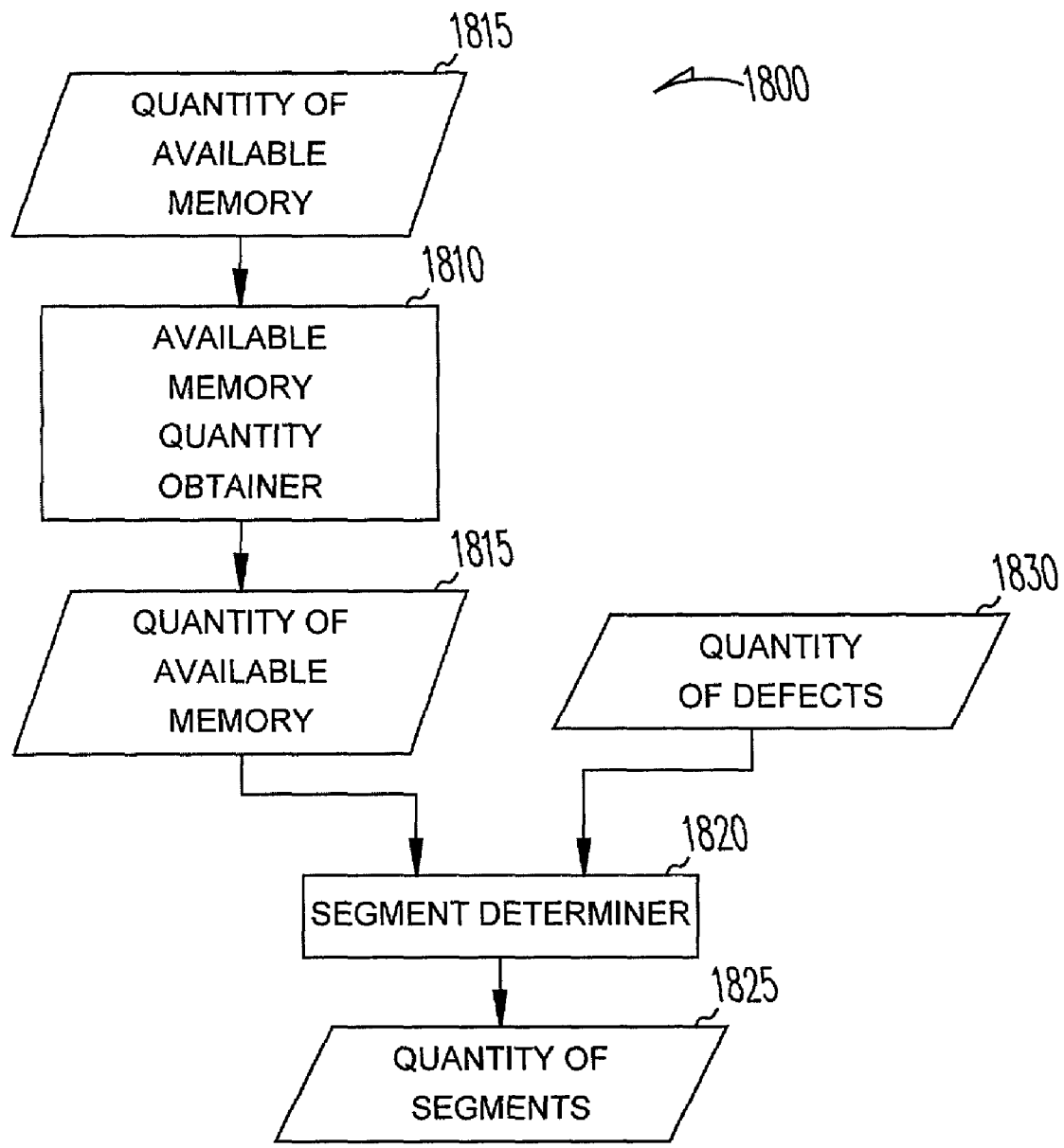
FIG. 18 is a block diagram of an apparatus of an embodiment of the adapter in FIG. 17.

FIG. 18 is a block diagram of an apparatus 1800 of an embodiment of the adapter 1725 in FIG. 17. Apparatus 1800 includes an obtainer 1810 of the quantity 1815 of available memory for storing the defect table in the volatile memory device. Apparatus 1800 also includes a determiner 1820 of the quantity of the one or more segments 1825 from the quantity of defects 1830 divided by the quantity of available memory 1815. Apparatus 1800 satisfies the need in the prior art for a system, method and/or apparatus that provides a defect table on the volatile memory device of the mass storage device that is adapted or optimized in reference to the quantity of defects 1830 on the recording medium.

The components of apparatus 1200, 1300, 1400, 1500, 1600, 1700, and 1800 can be embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as C or assembly language. The software components communicate in any of a number of means that are well-known to those skilled in the art, such as Application Program Interfaces (A.P.I.) or interprocess communication techniques such as Remote Procedure Call (R.P.C.), Common Object Request Broker Architecture (CORBA), Component Object Model (COM), Distributed Component Object Model (DCOM), Distributed System Object Model (DSOM) and Remote Method Invocation (RMI).

FIG. 19 is an exploded view of one embodiment of a disc drive of the present invention, this embodiment showing one type of magnetic disc drive 1900 having a rotary actuator. The disc drive 1900 is one example of mass storage devices, such as compact disc (CDROM) devices, tape cartridge devices, digital versatile disc (DVD) or digital video disc (DVD) devices. Other embodiments include other configurations and data recording and/or reading technologies. The disc drive 1900 includes a housing or base 1912, and a cover 1914. The base 1912 and cover 1914 form a disc enclosure. Rotatably attached to the base 1912 on an actuator shaft 1918 is an actuator assembly 1920. The actuator assembly 1920 includes a comb-like structure 1922 having a plurality of arms 1923. Attached to the separate arms 1923 on the comb 1922, are load beams or load springs 1924. Load beams or load springs are also referred to as suspensions.

Attached at the end of each load spring 1924 is a slider 1926, which carries a magnetic transducer 1950. In some embodiments, transducer 1950 includes an electromagnetic coil write head and a magneto-resistive read head. The slider 1926 with the transducer 1950 form what is often called the head. It should be noted that many sliders have one transducer 1950 and that is what is shown in the figures. It should also be noted that this invention is equally applicable to sliders having more than one transducer, such as what is referred to as an MR or magneto-resistive head in which one transducer 1950 is generally used for reading and another is generally used for writing. On the end of the actuator assembly 1920 opposite the load springs 1924 and the sliders 1926 is a voice coil 1928.

Attached within the base 1912 is a first magnet 1931 and/or a second magnet 1930. As shown in FIG. 19, the second magnet 1930 is associated with the cover 1914. The first and second magnets 1930, 1931, and the voice coil 1928 are the key components of a voice coil motor which applies a force to the actuator assembly 1920 to rotate it about the actuator shaft 1918. Also mounted to the base 1912 is a spindle motor. The spindle motor includes a rotating portion called a spindle hub 1933. In this particular disc drive, the spindle motor is within hub 1933. In FIG. 19, a number of discs 1934 (one or more; four are shown) are attached to the spindle hub 1933 to form disc assembly. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors, which are within the hub 1933 or under the hub.

Figure 20:
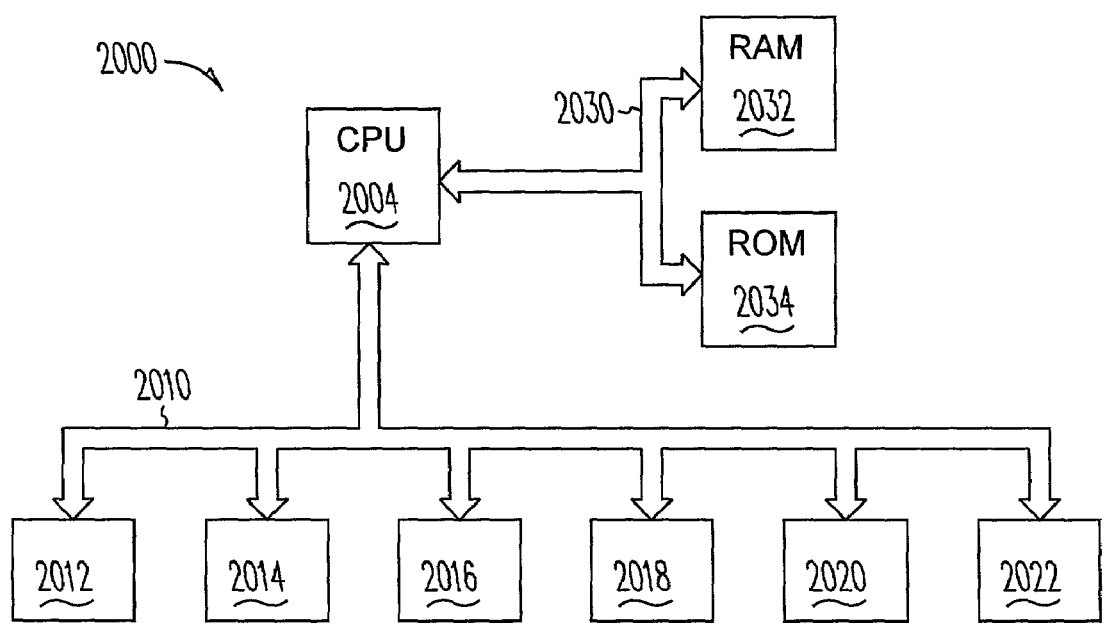
FIG. 20 is a schematic view of a computer system.

FIG. 20 is a schematic view of a computer system 2000. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The computer system 2000 includes a disc drive device. The computer system 2000 may also include an input/output bus 2010 and several peripheral devices, such as 2012, 2014, 2016, 2018, 2020, and 2022, which may be attached to the input output bus 2010. Peripheral devices may include hard disc drives, magneto-optical drives, floppy disc drives, monitors, keyboards and other such peripherals. Any type of disc drive may use the method for loading or unloading the slider onto the disc surface as described above.

CONCLUSION

In conclusion, systems and methods are disclosed through which the capacity of a defect buffer in a microcontroller of a mass storage is determined without regard for the quantity of defects on a recording medium. The capacity of the defect buffer is determined in varying examples, based on the amount of available space and/or the application of the storage device. In one embodiment, the capacity of the defect buffer is less than the quantity of defects on the recording medium, wherein entries in a defect table on the recording medium are swapped in and out of the defect buffer as needed, such as using a most-recently-used scheme. Systems and methods are also provided through which the defect table is divided or segmented into a plurality of defect tables that are physically distributed throughout the recording medium.

In one embodiment of the present invention, a method 500 for managing a defect table of a mass storage device includes obtaining 510 the defect table from the recording medium of the mass storage device, and copying 520 a portion of the defect table into a volatile storage medium. In one embodiment, the obtaining the defect table is reading the defect table. The volatile storage medium is operably coupled to a microcontroller and/or a microprocessor of the mass storage device. In one embodiment, the mass storage device is a disc drive, such as disc drive 1900 in FIG. 19. In another embodiment, the volatile storage medium is a cache.

One embodiment of the copying 520 includes determining 610 at least one of a plurality of portions of the defect table that are associated with the most recently used (MRU) plurality of data regions of the mass storage device, and copying 620 at least one of the portions of the defect table into a volatile storage medium. The volatile storage medium is operably coupled to the microcontroller of the mass storage device.

Another embodiment of the copying 510 includes determining 710 that the defect table is partitioned into a quantity of one or more segments. In a further embodiment, the segments are of equal size. In yet a further embodiment, the one or more segments are physically distributed throughout the recording medium. In addition, the copying 510 includes determining 720 that one or more segments will fit in a defect buffer, wherein the size of a portion and/or subset of the one or more segments is not greater than the predetermined and/or allocated size of the defect table in a volatile storage medium. The copying 510 also includes determining 730 that the defect table is larger than the defect buffer, wherein the size of the defect table is greater than the predetermined size of a defect table in the volatile storage medium. Thereafter, the copying 510 includes copying 740 the portion of the one or more segments of the defect table into the defect table in the volatile storage medium.

In an embodiment of method 500 where the volatile storage medium is partitioned into a quantity of one or more segments, method 500 also includes obtaining 810 the application of the mass storage device, and adapting 820 the quantity of the one or more segments to the application. In one embodiment of the adapting 820, the application is a multimedia application and the adapting 820 includes obtaining 910 the quantity of simultaneous multimedia streams, and setting 920 the quantity of the one or more segments in reference to the quantity of simultaneous multimedia streams.

In an embodiment of method 500 where the volatile storage medium is partitioned into a quantity of one or more segments, method 500 also includes obtaining 1010 the quantity of defects found during a manufacturing test process of the mass storage device, and adapting 1020 the quantity of the one or more segments to the quantity of defects. In one embodiment of the adapting 1020, the adapting includes obtaining 1110 the quantity of available memory for storing the defect table in the volatile memory device, and determining 1120 the quantity of defects divided by the quantity of the one or more segments from the quantity of available memory.

In one embodiment of the present invention an apparatus for managing a defect table 1230 stored on a recording medium 1210 of a mass storage device 1220 includes an obtainer 1205 of the defect table 1230 from the recording medium 1210 of the mass storage device 1220, wherein the defect table 1230 is partitioned into a plurality of portions, and a transferor 1225 of one of the plurality of portions of the defect table into a volatile memory device 1250, the transferor 1225 being operably coupled to the obtainer 1205.

In one embodiment of the transferor 1225, the transferor includes a determiner 1315 of at least one of a plurality of portions of the defect table that are associated with a plurality of most-recently-used data regions of the recording medium of the mass storage device, the determiner being operably coupled to the defect table on the recording medium, and a transferor 1305 of at least one of the plurality of the most-recently-used portions of the defect table into the volatile storage device 1350, the transferor 1325 being operably coupled to the determiner 1315, the defect table 1330, and the defect buffer 1360.

In another embodiment of the transferor 1225, the transferor 1225 includes a partition determiner 1415, that determines that the defect table on the recording medium 1410 is partitioned into a quantity of one or more segments, 1471 and 1472, the partition determiner 1415 being operably coupled to the recording medium 1410, a defect table size determiner 1425, that determines that the defect table on the recording medium is bigger than the defect buffer 1460 in the volatile memory device 1450, the size determiner 1425 being operably coupled to the recording medium 1410, and a segment transferor 1435, that transfers the portion of the one or more segments of the defect table on the recording medium 1410 into the defect buffer 1460 in the volatile storage device 1450, the segment transferor 1435 being operably coupled to the recording medium 1410, the partition determiner 1415, and the size determiner 1425. In a further embodiment, the one or more segments, 1471 and 1472, include one or more segments that are physically distributed throughout the recording medium 1410.

In yet a further embodiment of the present invention, a defect buffer 1560 in the volatile storage medium 1550 is partitioned into a quantity of one or more segments, and the apparatus includes an obtainer 1515 of the application of the mass storage device 1510, that obtains an indication of the type of application from a source, and an adapter 1525 that adapts the quantity of the one or more segments of the defect buffer 1560 in the volatile memory device 1550 to the application, the adapter 1525 being operably coupled to the obtainer 1515 and the defect buffer 1560. In a further embodiment, where the application is a multimedia application, the adapter 1525 includes an obtainer 1610 of the quantity 1615 of simultaneous multimedia streams, and a setter 1620 of the quantity of the one or more segments in reference to the quantity 1615 of simultaneous multimedia streams, the setter 1620 being operably coupled to the obtainer 1610 of the quantity of simultaneous multimedia streams.

In still a further embodiment of the present invention, wherein a defect buffer 1760 in the volatile storage medium 1750 is partitioned into a quantity of one or more segments, the apparatus includes an obtainer 1715 of a quantity of defects found during a manufacturing test process of the mass storage device 1720, and an adapter of the quantity of the one or more segments in the defect buffer 1760 to the quantity of defects, the adapter being operably coupled to the obtainer 1715.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

We claim:

1. A method for managing defects in a mass storage device, comprising:
   obtaining at least one segment of a defect table from a data storage medium of the mass storage device, wherein the defect table is partitioned into a plurality of segments;
   identifying at least one segment of the defect table that is associated with the most recently used data regions of the mass storage device; and
   copying at least one of the identified segments into a memory.

2. The method of claim 1, further comprising:
   obtaining an application of the mass storage device; and
   committing a portion of the memory to the application.

3. The method of claim 2, further comprising:
   obtaining a quantity of multimedia streams; and
   committing a portion of the memory to each multimedia stream.

4. The method of claim 1, further comprising:
   obtaining a quantity of defects found during a manufacturing test process of the mass storage device; and
   committing a portion of the memory to the quantity of defects.

5. The method of claim 1, wherein the mass storage device further comprises a disc drive.

6. The method of claim 1, wherein the memory further comprises a cache.

7. The method of claim 6, wherein the cache further comprises a cache selected from a group consisting of an associative cache, a first-in-first-out cache, a multilevel cache, a single level cache, a chained cache, and a linked list cache.

8. A data storage device, comprising:
   a data storage medium;
   a memory;
   a defect table listing the defects on the data storage medium, wherein the defect table is partitioned into a plurality of segments;
   a data storage controller, communicatively coupled to the data storage medium and the memory, operably configured to:
      identify at least one segment of the defect table that is associated with the most recently used data regions of the mass storage device and
      copy the at least one identified segment of the defect table into a memory.

9. The data storage device of claim 8, wherein the controller is further configured to:
   determine that a size of a segment is not greater than the memory; and
   copy the segment into the memory.

10. The data storage device of claim 8, wherein the plurality of segments further comprise more than one segments that are physically distributed throughout the data storage medium.

11. The data storage device of claim 8, wherein the controller is further configured to:
    obtain an application of the data storage device; and
    commit a portion of the memory to the application.

12. The data storage device of claim 11, wherein the application further comprises a multimedia application and the controller is further configured to:
    obtain a quantity of multimedia streams; and
    commit a portion of the memory to each multimedia stream.

13. The data storage device of claim 8, wherein the memory further comprises a cache.

14. An information handling system to manage one or more defects of a mass storage device comprising:
    a recording medium;
    a defect table that is partitioned into a plurality of segments;
    a processor operably coupled to the recording medium;
    a memory device operably coupled to the processor, having a defect buffer that is smaller than the defect table; and
    means operative on the processor for managing the defect table and the defect buffer.

15. The information handling system of claim 14, wherein the means operative on the processor further comprises:
    a command that, when executed, will transfer at least one of the plurality of segments of the defect table into the defect buffer.

16. The information handling system of claim 15, wherein the command further comprises the functions of:
    determining at least one of a plurality of segments of the defect table that are associated with a plurality of most-recently-used data regions of the recording medium; and
    transferring at least one of the plurality of the most-recently-used segments of the defect table into the memory device.

17. The information handling system of claim 15, wherein the command further comprises the functions of:
    determining that the defect table on the recording medium is partitioned into a plurality of segments;
    determining that the defect table on the recording medium is bigger than the defect table in the memory device; and
    transferring the segment of the one or more segments of the defect table on the recording medium into the defect table in the volatile storage device.

18. The information handling system of claim 17, wherein the one or more segments further comprise one or more segments that are physically distributed throughout the recording medium.

* * * * *